Aug. 27, 1946.　　　A. W. GELPCKE　　　2,406,536
DRILLING ANCHOR PART FOR BOLTS OR SCREW STUDS AND ITS USE
Filed July 8, 1944
FIG. 1
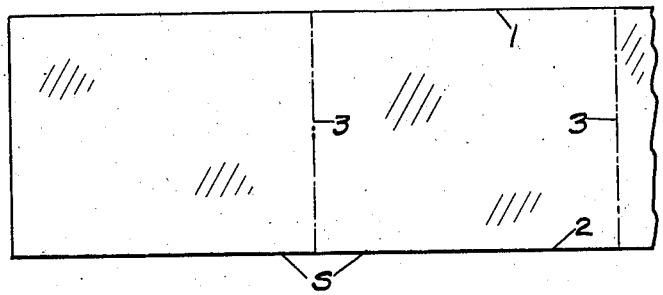
FIG. 2
FIG. 3a
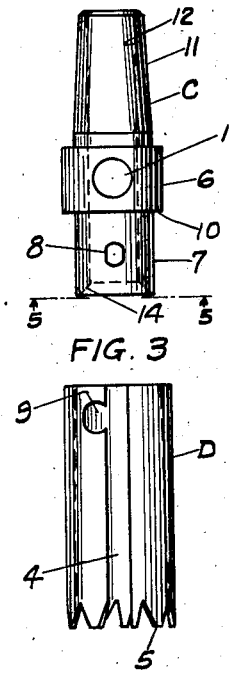
FIG. 5
FIG. 6
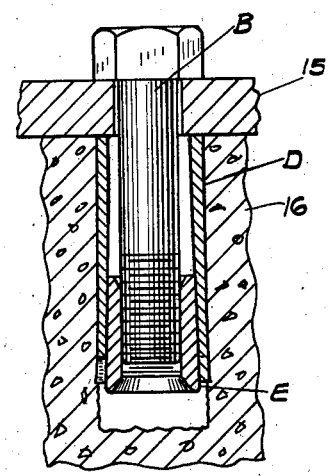
FIG. 3
FIG. 7
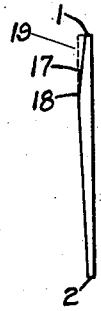
FIG. 4
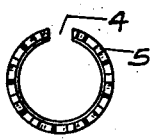
INVENTOR.
ALFRED W. GELPCKE
BY Patented Aug. 27, 1946

2,406,536

UNITED STATES PATENT OFFICE 2,406,536

DRILLING ANCHOR PART FOR BOLTS OR SCREW STUDS AND ITS USE

Alfred W. Gelpcke, Brooklyn, N. Y., assignor to The Rawlplug Company, Inc., New York, N. Y.

Application July 8, 1944, Serial No. 544,010

6 Claims. (Cl. 85—2.4)

This invention relates to improvements in the manufacture and utilization of anchors for bolt or screw studs.

In Mirzan Patent 1,755,264, issued April 22, 1930, there is disclosed a very good type of bolt or screw anchor composed of an elonagted expansible sleeve having a slot longitudinally of its length, and an internal taper against which operates the external taper of an expanding member that is internally threaded to receive the bolt or screw. With this construction, as tension is applied to the bolt or screw, the sleeve is continuously expanded throughout its length into engagement with the hole.

In my Patent 2,252,316, issued August 12, 1941, I have shown how the Mirzan patent construction may be improved, especially for use in connection with thin material.

My present application is directed to further improvements in these types of bolt and screw anchors; consequently, it is the principal object of my invention to provide an improved form of expansible sleeve as an anchor part, whereby this sleeve may be used, first, as a drill, and then as a part of the anchoring means on the hole which it has drilled.

Another object of my invention is to obtain the holding advantages of the above-mentioned patents by the use of an expansible sleeve which is capable of a plurality of functions.

Another object of my invention is to provide a dual-service part; that is to say, both a drill and an anchor part, in a cheaper and better manner than heretofore obtained.

The improvements are illustrated in the accompanying drawing, wherein:

Figure 1 is a plan view of the metal strip utilized in the construction of the dual-purpose device; i. e., drill and expansible member.

Figure 2 may be either a transverse, sectional or an end view of the strip shown in Figure 1.

Figure 3 is an elevational view of one of the pieces shown in Figure 1 after it has been formed into a drill.

Figure 3a is a view of the chuck used with the drill of Figure 3.

Figure 4 is a view of the toothed end of Figure 3.

Figure 5 is a view of the chuck shown in Figure 3a, looking in the direction of the line 5—5.

Figure 6 is a part-sectional and part-elevational view showing the dual-purpose device when it is used as an expansible sleeve.

Figure 7 is an end or sectional view similar to Figure 2 of a modified form of strip.

In the various views, wherein like numbers refer to corresponding parts, S is a strip of suitable material such as steel which will insure a hard cutting edge for the drilling operation either directly or by a hardening step in the process of manufacture. The strip S is formed so that the material tapers from the edge 1 to the edge 2. This may be done in the rolling operation on the strip of material; or the strip of material may be passed automatically through a press which flattens or forms the strip into tapered sections which are sheared on the broken lines 3 as the material goes through the machine.

After the individual pieces have been made, they are rolled or formed in a direction at right angles to the taper into the shape shown at D in Figure 3. In this figure, the device D has a substantially uniform outside diameter with a longitudinal slot or seam 4 throughout its length. One end, which originally was the edge 2 of the strip, has a plurality of teeth 5 cut or formed therein. These teeth may be formed during the rolling of the strip or the pressing and shearing of the pieces; or they may be cut in the end of the device D after it is formed.

In Figure 3a is shown a preferred form of chuck C which has a central portion 6 larger in diameter than the two adjacent ends. The end 7 has a diameter to fit the hole in the drill device D and is preferably provided with a stud 8 adapted to engage a recess or notch 9 positioned near the extremity of the device D opposite the toothed end 5. This construction provides means for withdrawing the drill from the hole any time during the drilling operation. The chuck is inserted into the drill D until the shoulder 10 on the enlarged portion 6 hits the end of the drill D and then turned so that the stud 8 engages the recess or notch 9.

The opposite end of the chuck is provided with a taper 11 suitable to fit a power-operated tool. As will be noted by the broken lines 12, the chuck C is hollow and the enlarged portion 6 is provided with a plurality of holes 13, three being shown in Figure 5 to allow the chips from the drill to pass out of the chuck, and to assist in this passage of the chips, the drill end of the chuck is provided with a short taper 14.

As shown in Figure 6, the drill D is used as a part of the anchor means; i. e., an expansible sleeve which is expanded by the expanding member E which may be of the type shown in my patent previously referred to, whereby when the bolt or stud B is passed through the member 15 into the expander E, the member D is expanded throughout its length into engagement with the walls of the hole in the masonry 16, it being understood that the hole in the masonry has been drilled by the device D in cooperation with the chuck C. Since considerable material has been removed from the end of the device D by the formation of the teeth 5 therein, these teeth may be expanded to a greater degree than the upper portion of the device D, thereby giving an additional grip on the walls of the hole at the bottom thereof.

In Figure 7, I have shown a modified form of the piece from which the drill D may be made. In this construction, the edge portion 1 is formed with a short taper 17 down to the point 18, and with a long taper from the point 18 to the edge 2, so that when the piece is formed or rolled into the position shown in Figure 3, the chuck end of the drill D is provided with a taper to receive the end 7 of the chuck which may be tapered to fit the taper 17; otherwise, the construction of the piece for forming the drill anchor part D is the same as already described.

In Figure 2, I have shown the piece for making the drill as tapered from one edge to the other, and in Figure 7, as tapering in two opposite directions from the point 18; however, the piece may have the part upward from the point 18 formed parallel to the opposite side as indicated by the dotted line 19, whereby the piece is then only tapered from the point 18 to the edge 2, thus providing a somewhat sharper taper than in the construction of Figure 2. This sharper taper may be preferred for certain classes of work.

In this specification, I have used the terms "bolt or screw stud" in their broadest sense to include machine screws or the equivalent, which may be used in the manner and for the purposes herein set forth.

While it is old to use a tubular drill as a drill or expansible member for a bolt or screw anchor part, I have made an improved type of such device with an improved chuck for operating it, to which the appended claims are directed.

What I claim is:

1. A drilling anchor part for bolts or screw studs consisting of a single piece of suitable metal formed into a cylindrically shaped body with a longitudinal seam of substantial width from a piece having a tapering thickness from one edge to the other, so when the piece is formed into said body in an end-to-end direction, the body will have an internal taper from end to end, that end with the greatest internal diameter having cutting teeth therein, while the other end has a formation to anchor a chuck therein.

2. A drilling anchor part consisting of a single piece of hard, relatively flat metal formed into a cylindrically shaped body having a uniform outer diameter with a full longitudinal seam of substantial width, the piece having an internal uniform taper from one edge to the other, but formed in a direction at right angles to the taper, that end with the greatest internal diameter of the body having cutting teeth therein on what was one edge part of the piece before forming, while the other end of the body has a formation near the extremity to anchor a chuck therein.

3. A device which may be used as a drill or drill-and-bolt-or-screw-stud-anchor part adapted to receive an expanding device composed of a single piece of suitable sheet metal formed into a cylinder having preferably a uniform outside diameter and a longitudinal split, the piece itself having a continuous taper across a part of its width from one edge, and formed at right angles to the taper so the taper will be on the inside of the cylinder with its largest diameter at said edge, the device having cutting teeth around one end at the edge where the continuous taper starts and chuck-holding means near the opposite end.

4. Means for anchoring bolts or screw studs in masonry or the like, including a device made from a piece of sheet or strip metal which tapers from one edge for at least the greater part of its width toward the other edge, and then formed cylindrically at right angles to the direction of the taper, leaving a longitudinal seam, the device having cutting teeth directly on one end, formerly an edge of the piece which becomes the large diameter of said greater part of the taper, and chuck-anchoring means near the opposite end, said device serving to drill a hole in the masonry or the like and then to act as an expansion sleeve to grip the walls of the hole when a threaded expansion member is placed in the toothed end of the device and the assembled unit inserted as described into the hole, ready to receive a bolt or stud into the expansion member.

5. Means for anchoring bolts or screw studs in masonry or the like, including a device for drilling a hole in the masonry or the like and later acting as an expansible sleeve, a chuck for holding said device, while drilling the hole, and an expanding member to enter the drilling end of said device before both are inserted into the hole, said device being formed from a single piece of suitable metal into a cylinder having a full longitudinal split and uniform outside diameter, the piece of metal being tapered from one edge toward the other edge for at least the greater part of the width of the piece, and formed in a direction at right angles to the taper, whereby the cylinder has a smooth internal taper from one end toward the other, one end having cutting teeth in its periphery adjacent the largest diameter of the taper in said greater part of the piece, and the opposite end having a formation to receive the end of said chuck, the chuck being hollow with one end constructed to drivingly fit said drilling device, while the other end is externally tapered to fit a power apparatus, the drill end of the chuck having a sharply internally positioned taper and an enlarged portion between its two end portions, with a plurality of cross-bores in said enlarged portion for the purpose described.

6. A device which may be used as a drill or drill-and-bolt-or-screw-stud-anchor part composed of a single piece of suitable sheet metal formed into a cylinder having substantially a uniform outside diameter and a longitudinal split, the piece itself having one straight side across its width, and the opposite side having one long taper from one edge of the piece toward the opposite edge but terminating a distance from said edge, and a short taper extending from the termination of the long taper in reverse direction to the said opposite edge, the piece being formed at right angles to said tapers so the tapers are internally positioned in the split cylinder, the short taper serving to receive the tapered end of a chuck when the device is used as a drill for drilling a hole in masonry, the long taper having its greatest internal diameter at what was one edge of the piece with this edge having teeth therein and being adapted to receive an expanding member when the device is used as a bolt or screw anchor part.

ALFRED W. GELPCKE.